United States Patent [19]

Steinman

[11] 3,856,787
[45] Dec. 24, 1974

[54] 1-SUBSTITUTED-2-THIO-1H-1,4-BENZODIAZEPINES
[75] Inventor: Martin Steinman, Livingston, N.J.
[73] Assignee: Schering Corporation, Bloomfield, N.J.
[22] Filed: Sept. 14, 1972
[21] Appl. No.: 289,023

[52] U.S. Cl. .................. 260/243 R, 260/239 BD, 260/239.3 D, 424/244, 424/246
[51] Int. Cl. .............................................. C07d 53/06
[58] Field of Search .................. 260/239 BD, 243 R

[56] References Cited
UNITED STATES PATENTS
3,678,036   7/1972   Archer et al. ................ 260/239 BD Primary Examiner—Henry R. Jiles
Assistant Examiner—Robert T. Bond
Attorney, Agent, or Firm—Bruce M. Eisen; Stephen B. Coan

[57] ABSTRACT

Disclosed herein are 1-substituted-2-thio-1H-1,4-benzodiazepines which are useful anti-anxiety agents, anti-convulsants, skeletal muscle relaxants and sedative-hypnotic agents.

9 Claims, No Drawings

1-SUBSTITUTED-2-THIO-1H-1,4-BENZODIAZEPINES

This invention relates to chemical compounds which may be considered chemically as 1-substituted-2-thio-1H-1,4-benzodiazepines and to the processes for making and using such compounds. These compounds beneficially affect mammalian central nervous systems and particularly are useful as anticonvulsants, anti-anxiety agents, muscle relaxants and sedative-hypnotic agents.

In one inventive process aspect, the invention may be described as the selective reduction of a 1-substituted-1,3-dihydro-5-aryl-2H-1,4-benzodiazepin-2-thione to produce the corresponding 2,3-thio-benzodiazepine.

The compounds of this invention may be represented by the structural formulae:

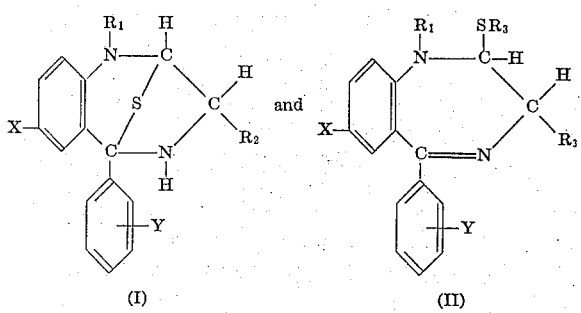

wherein X is halogen, trifluoromethyl or nitro; $R_1$ is lower alkyl, polyfluorolower alkyl, phenyl-loweralkyl, cyclopropylmethyl or

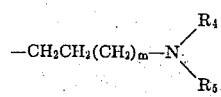

wherein $m$ is 0 or 1 and $R_4$ and $R_5$ are each hydrogen or lower alkyl; $R_2$ is hydrogen, lower alkyl, hydroxy or lower alkanoyloxy; $R_3$ is lower alkyl or

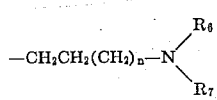

wherein $n$ is 0 or 1 and $R_6$ and $R_7$ are each hydrogen or lower alkyl; Y is hydrogen, halogen, trifluoromethyl, nitro, hydroxy, lower alkyl or lower alkoxy, and the 4-N-oxides and the pharmaceutically acceptable acid addition salts thereof.

As used herein, the term "lower alkyl" refers to both straight and branched-chain hydrocarbon radicals having up to six carbon atoms such as methyl, ethyl, propyl, isopropyl, n-butyl, t-butyl and the like. "Phenyl-lower alkyl" can be illustrated by phenethyl and benzyl. "Lower alkoxy" includes ether radicals wherein the lower alkyl moiety is as defined for "lower alkyl" above, such as, for example, methoxy, ethoxy, propoxy and the like. "Lower alkanoyloxy" includes those esters containing the acyl radicals of alkanoic acids having up to six carbon atoms such as acetyl, propionyl, butyryl, valeryl, hexanoyl and the branched-chain isomers thereof. The term "halogen" as used herein comprehends all four halogens. In the preferred embodiment of this invention X is chloro.

The term "polyfluoro-lower alkyl" refers to lower alkyl radicals substituted with more than one fluoro radical and includes such moieties as 2,2,2-trifluoroethyl, trifluoromethyl, 2,2,3,3,3-pentafluoropropyl and the like. In a preferred embodiment of this invention the polyfluoro-lower alkyl moiety has two alpha hydrogen atoms, i.e., $R_fCH_2$-wherein $R_f$ is polyfluoroalkyl. Most preferably, $R_f$ is trifluoromethyl, i.e., the 1-(2,2,2-trifluoroethyl) species.

Pharmaceutically acceptable acid addition salts are well known. Such salts include those formed in the conventional manner with both inorganic and organic acids such as hydrochloric acid, hydrobromic, nitric acid, sulfuric acid, acetic acid, formic acid, succinic acid, maleic acid, p-toluenesulfonic acid and the like.

The compounds of formula I can be prepared by the selective reaction of the corresponding benzodiazepin-2-thione with about a stoichiometric amount of lithium aluminum hydride under controlled conditions. The order of addition should be inverse, i.e., the $LiAlH_4$ is added to the benzodiazepin-2-thione. Further, the addition should be effected at a reduced temperature, i.e., less than about 10° C and typically at 0° C. The reaction can be depicted as follows:

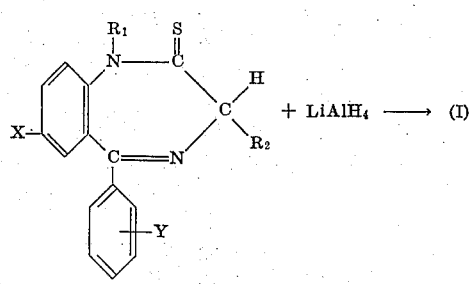

wherein X, $R_1$, $R_2$ and Y are as previously defined. A suitable inert organic solvent is employed such as tetrahydrofuran, dioxane, diethylether, benzene or the like. The benzodiazepin-2-thione starting materials may be prepared according to the teachings of Belgian Pat. No. 770,978.

The compounds of this invention represented by formula II can be prepared by reacting a corresponding 2-hydroxybenzodiazepine (tautomeric with 2,3-oxybenzodiazepine) with an appropriate mercaptan, such as ethanethiol, which reaction may be depicted as follows:

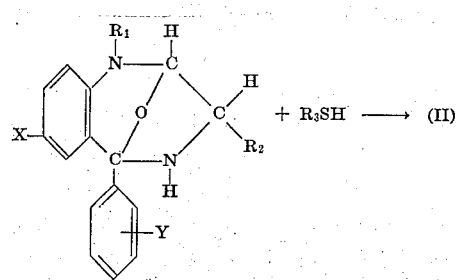

wherein X, $R_1$, $R_2$, $R_3$ and Y are as previously defined. The 2-hydroxy or 2,3-oxy-benzodiazepine starting material may be prepared according to the teachings of Belgian Pat. No. 742,124.

The following examples illustrate the preparation of representative compounds of this invention.

EXAMPLE 1

7-Chloro-2,3-Dihydro-1-(β,β,β-Trifluoroethyl)-2-Thioethyl-5-Phenyl-1H-1,4-Benzodiazepine Dissolve 1.5 g. of 7-chloro-1-(β,β,β-trifluoroethyl)-2,3,4,5-tetrahydro-5-phenyl-2,5-oxy-1H-1,4-benzodiazepine in 10 ml. of ethanethiol. Cover the solution and allow it to stand at room temperature for 3 days. Evaporate the solution under a stream of nitrogen. Dissolve the solid residue in a small amount of benzene-ethyl acetate (10:1) and chromatograph on 150 g. of silica gel. Obtain the product of this example upon recrystallization from aqueous ethanol, m.p. 110°–111°C.

Similarly, one can prepare other compounds of this invention by substituting the corresponding 2,3-oxy or 2-hydroxy-benzodiazepine to produce the desired 1-substituted-2-thioalkyl-2,3-dihydro-5-aryl-1H-1,4-benzodiazepine, as for example:

7-chloro-1-dimethylamino-2-thioethyl-2,3-dihydro-5-(o-fluorophenyl)-1H-1,4-benzodiazepine; 7-trifluoromethyl-1-ethyl-2-thioethyl-2,3-dihydro-3-methyl-5-(p-iodophenyl)-1H-1,4-benzodiazepine; 7-nitro-1-trifluoromethyl-2-thioethyl-2,3-dihydro-5-(p-tolyl)-1H-1,4-benzodiazepine; 7-chloro-1-(2,2,3,3,3-pentafluoropropyl)-2-thioethyl-2,3-dihydro-5-phenyl-1H-1,4-benzodiazepine; 7-bromo-1-(1,2,2,2-tetrafluoroethyl)-2-thioethyl-2,3-dihydro-3-methyl-5-(o-chlorophenyl)-1H-1,4-benzodiazepine, and 7-fluoro-1-phenethyl-2-thioethyl-2,3-dihydro-5-(m-nitrophenyl)-1H-1,4-benzodiazepine.

EXAMPLE 2

7-Chloro-5-Phenyl-1-(β,β,β-Trifluoroethyl)-2,3,4,5-Tetrahydro-2,5-Thio-1,4-Benzodiazepine Cool a solution of 3.68 g. of 7-chloro-2,3-dihydro-5-phenyl-1-(β,β,β-trifluoroethyl)-1H-1,4-benzodiazepin-2-thione in 75 ml. of dry tetrahydrofuran to 0°C. To the solution, slowly add 0.38 g. of lithium aluminum hydride. After complete addition, stir the mixture for 5 minutes and then quench with wet ether. Filter the mixture, dry with sodium sulfate and evaporate. Recrystallize the residue from methylene chloride-hexane to yield the compound of this example, m.p. 163°–168°C.

EXAMPLE 3

7-Chloro-1-Methyl-5-Phenyl-2,3,4,5-Tetrahydro-2,5-Thio-1H-1,4-Benzodiazepine

Dissolve 5 g. of 7-chloro-1,3-dihydro-1-methyl-5-phenyl-2H-1,4-benzodiazepin-2-thione in 125 ml. of dry tetrahydrofuran. Cool the solution in an ice-salt water bath and add 0.634 g. of lithium aluminum hydride. After 5 minutes quench the reaction with water. Filter the mixture, dry over sodium sulfate and evaporate to yield the crude compound of this example, which is then recrystallized from methylene chloride, m.p. 160°–163°C (dec.).

The compounds of this invention exert such selective effects on the mammalian central nervous system as to be particularly useful as sedative-hypnotics, anti-convulsants, muscle relaxants and anti-anxiety agents.

Based upon standard laboratory investigative procedures, such as the Antagonism of Pentylene Tetrazole, Everett and Richard, J. Pharm. and Exp. Ther., Vol. 81, pg. 402 (1944); Antagonism of Maximal Electro-Shock-Induced Seizures in Mice, Synard, E.A. et al., J. Pharm. and Exp. Ther., Vol. 106, pg. 319 (1952); Antagonism of Foot-Shock Induced Fighting in Mice, Tedeschi, et al., J. Pharm. and Exp. Ther., Vol. 125, pg. 28 (1959); Taming Activity in Monkeys, Randall Diseases of the Nervous System, Vol. 21, pg. 7 (1960); System Activity and Acute Toxicity, Irwin, Science, 136, pg. 123 (1967), it is indicated that the compounds of this invention, when administered to man within the dosage range of about 0.5 to 3 mg./kg. of body weight per day, produce the hereinabove described beneficial pharmacological effects. These dosage regimen are preferably administered orally in divided doses.

The compounds of this invention may be administered alone or combined with other medicaments. In any event, a suitable pharmaceutically acceptable carrier is generally employed. A carrier is selected taking account of the intended route of administration, the physical properties of the compounds, and standard pharmaceutical practice. It should not react chemically with the compound to be administered. The compositions of this invention are preferably administered orally, although parenteral administration is also contemplated. The preparations containing the active ingredients of this invention may be in the form of tablets, capsules, syrups, elixirs, suspensions and the like.

In the formulations of pharmaceutical preparations there can be employed such pharmaceutically acceptable diluents, as for example, water, gelatin, lactose, starches, magnesium stearate, talc, vegetable oils and gums. The following examples show typical tablet and capsule formulations incorporating a compound of this invention.

TABLET FORMULATIONS

I. Formula and Method of Manufacture for 7-chloro-1-(β,β,β-trifluoroethyl)-2,3-dihydro-5-(o-fluorophenyl)-1H-1,4-benzodiazepin-2-thione.

| Coated Tablets: | mg/core |
|---|---|
| 7-Chloro-1-(β, β, β-trifluoroethyl)-2-thioethyl-2,3,-dihydro-5-(o-fluorophenyl)-1H-1,4-benzodiazepine | 25 |
| Lactose, USP | 41 |
| Dicalcium Phosphate | 40 |
| Sodium Lauryl Sulfate | 10 |
| Polyvinylpyrrolidone | 10 |
| Water 50 ml/1000 cores | |
| Corn Starch | 20 |
| Dry | mg/core |
| Sodium Lauryl Sulfate | 2 |
| Magnesium Stearate | 2 |
| Tablet Weight | 150 |

Procedure

The 7-chloro-1-(β,β,β-trifluoroethyl)-2,3-dihydro-2-thioethyl-5-(o-fluorophenyl)-1H-1,4-benzodiazepine is mixed with the lactose, dicalcium phosphate, and sodium lauryl sulfate. The above mixture is screened through a No. 60 screen and granulated with an aqueous solution containing polyvinylpyrrolidone. Add additional water, if necessary, to bring powders to a pasty mass. Add corn starch and continue mixing until uniform granules are formed. Pass through a No. 10 screen, tray and dry in oven at 100°C for 12–14 hours. Reduce dried granulation through a No. 16 screen, add sodium lauryl sulfate and magnesium sulfate, mix and compress into desired shape on a tablet machine.

Coating

The above cores are treated with a lacquer and dusted with talc to prevent moisture absorption. Sub-coat layers are added to round out the core. A sufficient number of lacquer sub-coats and smoothing coats are applied to completely round out and smooth the tablet. Color coats are applied until desired shade is obtained. After drying, the coated tablets are polished to give the tablets an even gloss.

II. Capsule Formulations:

| Formula: | mg/capsule |
| --- | --- |
| 7-Chloro-1-(β, β, β-trifluoroethyl)-2,3,- dihydro-2-thioethyl-5-(o-fluorophenyl)- 1H-1,4,-benzodiazepine | 25 |
| Sodium Lauryl Sulfate | 20 |
| Lactose | 129 |
| Magnesium Stearate | 76 |
| | 250 |

Procedure

Mix together 7-chloro-1-(β, β,β-trifluoroethyl)-2,3-dihydro-2-thioethyl-5-(o-fluorophenyl)-1H-1,4-benzodiazepine, sodium lauryl sulfate and lactose. Pass through a No. 80 screen. Add magnesium stearate, mix and encapsulate into the proper size two-piece gelatin capsule.

III. Suppository

| Formula: | mg/2 gs. |
| --- | --- |
| 7-Chloro-1-(β, β, β-trifluoroethyl)-2,3- dihydro-2-thioethyl-5-(o-fluorophenyl)- 1H-1,4-benzodiazepine, micronized | 50 |
| Theobroma Oil, Pharm. Grade to make | 2 gms. |

Method of Preparation

Prepare a slurry of the 7-chloro-1-(β,β,β-trifluoroethyl)-2,3-dihydro-2-thioethyl-5-(o-fluorophenyl)-1H-1,4-benzodiazepine with a portion of the melted theobroma oil to bring the batch to final weight. Pour the melted mix, while maintaining uniformity, into appropriately prepared molds and allow to cool.

Numerous variations of the above compositions of matter and processes for the manufacture will be apparent to one skilled in the art within the spirit of the present invention.

What is claimed is:

1. A 1-substituted-2-thio-1H-1,4-benzodiazepine selected from the group represented by formula I:

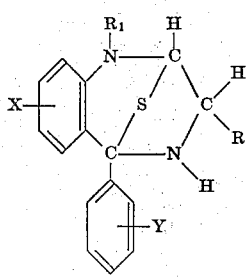

and formula II:

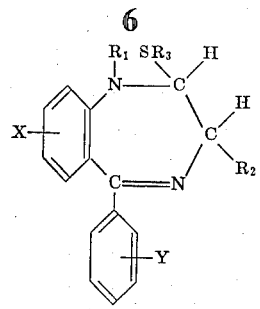

wherein X is halogen, trifluoromethyl or nitro; $R_1$ is lower alkyl, polyfluoro-lower alkyl or phenyl-lower alkyl; $R_2$ is hydrogen or lower alkyl; $R_3$ is lower alkyl or

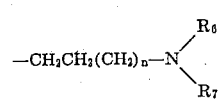

where n is 0 or 1 and $R_6$ and $R_7$ are each hydrogen or lower alkyl; Y is hydrogen, halogen or lower alkyl; and the 4-N-oxides and the pharmaceutically acceptable acid addition salts thereof.

2. A compound according to claim 1 represented by the formula:

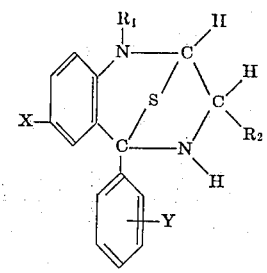

wherein X is halogen, trifluoromethyl or nitro; $R_1$ is lower alkyl, polyfluoro-lower alkyl or phenyl-lower alkyl; $R_2$ is hydrogen or lower alkyl; Y is hydrogen, halogen or lower alkyl; and the 4-N-oxides and the pharmaceutically acceptable acid addition salts thereof.

3. A compound according to claim 2 wherein X is chloro.

4. A compound according to claim 2 wherein $R_1$ is polyfluoro-lower alkyl.

5. A compound according to claim 4 wherein X is chloro.

6. A compound according to claim 1 represented by the formula:

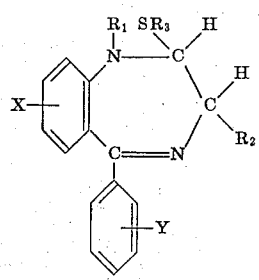

wherein X is halogen, trifluoromethyl or nitro; $R_1$ is lower alkyl, polyfluoro-lower alkyl or phenyl-lower alkyl; $R_2$ is hydrogen or lower alkyl; $R_3$ is lower alkyl or

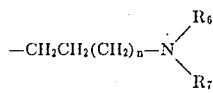

where n is 0 or 1 and $R_6$ and $R_7$ are each hydrogen or lower alkyl; Y is hydrogen, halogen, or lower alkyl; and the 4-N-oxides and the pharmaceutically acceptable acid addition salts thereof.

7. A compound according to claim 6 wherein X is chloro.

8. A compound according to claim 7 wherein $R_1$ is polyfluoro-lower alkyl.

9. A process for the preparation of a compound of the formula:

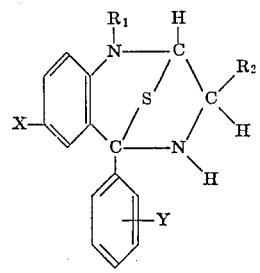

wherein X is halogen, trifluoromethyl or nitro; $R_1$ is lower alkyl, polyfluoro-lower alkyl, or phenyl-lower alkyl; $R_2$ is hydrogen or lower alkyl; Y is hydrogen, halogen, or lower alkyl; and the 4-N-oxides and pharmaceutically acceptable acid addition salts thereof; comprising adding lithium aluminum hydride to an inert organic solvent containing an approximately stoichiometric amount of a benzodiazepin-2-thione of the formula:

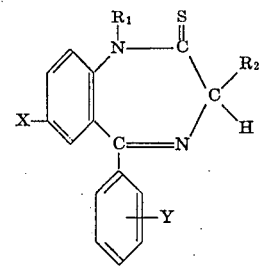

wherein X, Y, $R_1$ and $R_2$ are as previously defined, said adding being conducted at a temperature less than 10°C.

* * * * *